United States Patent
Ummer et al.

(10) Patent No.: US 8,762,020 B2
(45) Date of Patent: Jun. 24, 2014

(54) METHOD FOR SUPPORTING A BRAKE SYSTEM IN CASE OF REDUCED EFFECTIVENESS OF THE VEHICLE BRAKE SYSTEM

(75) Inventors: Bernd Ummer, Bodnegg (DE); Holger Esslinger, Alzey (DE)

(73) Assignee: Continental Teves AG & Co. OHG, Frankfurt (DE)

(*) Notice: Subject to any disclaimer, the term of this patent is extended or adjusted under 35 U.S.C. 154(b) by 1197 days.

(21) Appl. No.: 11/663,514

(22) PCT Filed: Sep. 20, 2005

(86) PCT No.: PCT/EP2005/054687
§ 371 (c)(1),
(2), (4) Date: Apr. 15, 2011

(87) PCT Pub. No.: WO2006/032659
PCT Pub. Date: Mar. 30, 2006

(65) Prior Publication Data
US 2011/0270500 A1    Nov. 3, 2011

(30) Foreign Application Priority Data

Sep. 24, 2004  (DE) .................. 10 2004 046 378

(51) Int. Cl.
G06F 7/70      (2006.01)
G06F 19/00     (2011.01)
G06G 7/00      (2006.01)
G06G 7/76      (2006.01)

(52) U.S. Cl.
USPC .......................................................... 701/70

(58) Field of Classification Search
USPC .......................................................... 701/70
See application file for complete search history.

(56) References Cited

U.S. PATENT DOCUMENTS

| 5,727,852 A | * | 3/1998 | Pueschel et al. .......... 303/113.4 |
| 6,226,586 B1 | | 5/2001 | Luckevich et al. |
| 7,434,894 B2 | * | 10/2008 | Toelge ............................ 303/15 |

FOREIGN PATENT DOCUMENTS

DE           10238427           5/2003

\* cited by examiner

*Primary Examiner* — Maceeh Anwari

(57) ABSTRACT

Disclosed is a method for increasing the braking effect in a motor vehicle having a hydraulic brake system. An energy supply unit, which is used to increase the brake pressure in at least one wheel brake, is switched on when the brake pressure adjusted by the driver in a master brake cylinder exceeds a first activation threshold value, which is determined depending on a detected vehicle deceleration, and the energy supply unit is switched off when the brake pressure reaches a predetermined bottom threshold value at a specific instant. According to the method, within an interval beginning at that specific instant, it is checked whether the brake pressure ($p_{TMC}$) rises again using a comparison between the brake pressure and a second activation threshold ($p_{AT,red}$) that is reduced compared to the first activation threshold ($p_{AT}$) and/or using a comparison between a brake pressure gradient and a predetermined threshold value, and in that the energy supply unit is switched on again when a new rise of the brake pressure ($p_{TMC}$) has been detected. Also disclosed is a device that is suitable for implementing the method.

7 Claims, 2 Drawing Sheets

METHOD FOR SUPPORTING A BRAKE SYSTEM IN CASE OF REDUCED EFFECTIVENESS OF THE VEHICLE BRAKE SYSTEM

BACKGROUND OF THE INVENTION

The present invention relates to a method for increasing the braking effect in a motor vehicle with a hydraulic brake system, wherein an energy supply unit, which is used to increase the brake pressure in at least one wheel brake, is switched on when the brake pressure adjusted by the driver in a master brake cylinder exceeds a first activation threshold, which is determined depending on a detected vehicle deceleration, and the energy supply unit is switched off when the brake pressure reaches a predetermined bottom threshold value at a specific instant.

In addition, the invention relates to a device that is suitable for implementing the method.

When subjected to high thermal load, under the influence of saline solution and major wear, hydraulic brakes of a vehicle exhibit a reduced effectiveness so that, even given a high initial pressure in the master brake cylinder of the brake system that is adjusted by the driver, the brake system will not bring about sufficient deceleration of the vehicle. The reduced braking effect at high working temperatures of the brake system is referred to as 'fading'.

In the cases illustrated hereinabove, the reduced braking effect of the vehicle brake system results, however, especially from a reduced coefficient of friction between the brake pads and the brake disc, so that a special rate of brake pressure is required in order to brake the vehicle effectively.

German published application DE 102 38 427 A1 discloses a method of the type initially referred to, wherein in case of limited effectiveness of the vehicle brake, enabling of an energy source causes increase of the brake pressure or the brake force in the wheel brakes because hydraulic fluid is pumped out of the master brake cylinder into the wheel brakes. A method of this type is also referred to as FBS function (FBS: Fading Brake Support).

The energy source, which is usually a pump, is activated in the FBS function when the initial pressure in the master brake cylinder adjusted by the driver exceeds an activation threshold, which is determined depending on the vehicle deceleration. Thus, the pump is switched on when the actual vehicle deceleration is by a defined value lower than the vehicle deceleration that is expected due to the adjusted initial pressure.

The pump is usually switched off when the initial pressure in the master brake cylinder drops below a predetermined threshold value. This is based on the fact that the braking request of the driver is determined by way of the initial pressure. Thus, it is assumed when the brake pressure declines that the driver releases the brake.

When the energy source is switched on, the initially pressure in the master brake cylinder declines, however, also without the driver releasing the brake because hydraulic fluid is sucked through the pump out of the master brake cylinder.

After deactivation of the energy source, hydraulic fluid flows back into the master brake cylinder, and the initial pressure rises again. When it exceeds the activation threshold again, the FBS function is re-activated.

Thus, a cyclically repeating sequence of activating and deactivating the FBS function occurs during a brake operation, with the frequency at which the cycles repeat being defined by the periodic time variation of the initial pressure.

However, it has been found out that as this occurs, very long phases with a deactivated FBS function generally occur, in which the effectiveness of the brake system is only reduced. This allows achieving only in part the aim of shortening the stopping distance of a vehicle in a case of limited effectiveness of the brake system.

At very high working temperatures of the brake system, overheating of the brake fluid may further cause a drop in pressure in the brake system, which can have as a result that the activation threshold of the FBS function after disabling of the energy source is not reached again. Despite an extremely reduced braking effect, the FBS function will no longer support the brake operation, and the stopping distance of the vehicle becomes considerably longer.

Another reason for the increased volume requirement or drop in pressure in the brake system, respectively, is that the brake pads become 'soft' at high temperatures, and that there is, hence, a very low coefficient in friction between the pads and the brake disc.

In view of the above, an object of the invention is to improve the effectiveness of the FBS function and, thus, shorten the stopping distance of the vehicle.

SUMMARY OF THE INVENTION

According to the invention, this object is achieved by a method for increasing the braking effect in a motor vehicle with a hydraulic brake system wherein an energy supply unit, which is used to increase the brake pressure in at least one wheel brake, is switched on when the brake pressure adjusted by the driver in a master brake cylinder exceeds a first activation threshold, which is determined depending on a detected vehicle deceleration, and the energy supply unit is switched off when the brake pressure reaches a predetermined bottom threshold value at a specific instant, wherein within an interval beginning at that specific instant, it is checked whether the brake pressure ($p_{TMC}$) rises again using a comparison between the brake pressure and a second activation threshold ($p_{AT,red}$) that is reduced compared to the first activation threshold ($p_{AT}$) and/or using a comparison between a brake pressure gradient and a predetermined threshold value, and in that the energy supply unit (9, 10) is switched on again when a new rise of the brake pressure ($p_{TMC}$) has been detected.

The object is also achieved by a a device for increasing the braking effect of a hydraulic brake system of a motor vehicle, comprising a master brake cylinder, in which a brake pressure transmittable to at least one wheel brake can be built up, a pressure sensor adapted to sense the brake pressure in the master brake cylinder, a control unit connected to the pressure sensor, and an energy supply unit that is controllable by the control unit and can be enabled when it is detected in the control unit that the brake pressure in the master brake cylinder exceeds a first activation threshold that is calculated depending on the vehicle deceleration, and which can be disabled when the brake pressure reaches a bottom threshold value at a specific instant. A counter in the control unit is adapted to be activated at this specific instant and to be deactivated at a predetermined count of the counter, and in that with the counter operating, a comparison can be performed in the control unit between the brake pressure ($p_{TMC}$) in the master brake cylinder (3) and a second activation threshold ($p_{AT,red}$) that is reduced compared to the first activation threshold ($p_{AT}$) and/or a comparison between a brake pressure gradient determined from the signals of the pressure sensor (14) and a predetermined threshold value, and the energy supply unit (9, 10) can be activated with the counter operating, when one of the comparisons has as a result that the brake pressure ($p_{TMC}$) exceeds the second activation threshold and/or the brake pressure gradient exceeds the predetermined threshold value.

The invention arranges that a method of the type initially mentioned is implemented in such a fashion that, within an interval beginning at that specific instant, it is checked whether the brake pressure rises again using a comparison between the brake pressure and a second activation threshold that is reduced compared to the first activation threshold and/or using a comparison between a brake pressure gradient and a predetermined threshold value, and in that the energy supply unit is switched on again when a new rise of the brake pressure has been detected.

Thus, the invention is based on the idea of activating the FBS function after a drop in pressure already when a new pressure rise is detected, rather than at the time when the pressure reaches the first activation threshold again. As a result, the FBS function is re-activated more quickly so that the phases with deactivated FBS function that exist during a brake operation are shortened and the braking effect of the brake system is, hence, increased.

In addition, it is especially advantageous that the FBS function in the method of the invention is reactivated also when the brake pressure after the previous deactivation rises only to a low degree due to a drop in pressure in the brake system.

To detect the re-increase of the brake pressure, it is favorably arranged in the invention that a comparison between the brake pressure and a second activation threshold that is reduced compared to the first activation threshold and/or a comparison between the brake pressure gradient and a predetermined threshold value is performed.

In a particularly favorable embodiment of the invention, it is provided that the energy supply unit is switched on again when the brake pressure exceeds the second activation threshold.

In another particularly favorable embodiment of the invention, it is additionally provided that the energy supply unit is switched on again when the brake pressure gradient exceeds the predetermined threshold value.

Further, the energy supply unit is switched on in a favorable embodiment of the invention again according to the first activation threshold, when no new increase of the brake pressure is detected within the predetermined interval after a drop of the brake pressure below a predetermined threshold value.

This way, at the beginning of a subsequent brake operation, again the first activation threshold that is calculated depending on the vehicle deceleration is made the basis for the activation of the FBS function, i.e. the FBS function is activated in a subsequent brake operation only when a reduced effectiveness of the brake system is detected.

In another favorable embodiment of the invention, the energy supply unit is a pump driven by a motor.

It is preferred that the energy supply unit is a component of an ESP system.

Another object of the invention is directed to a device for increasing the braking effect of a hydraulic brake system of a motor vehicle, comprising a master brake cylinder, in which a brake pressure transmittable to at least one wheel brake can be built up, a pressure sensor adapted to sense the brake pressure in the master brake cylinder, a control unit connected to the pressure sensor, and an energy supply unit that is controllable by the control unit and can be enabled when it is detected in the control unit that the brake pressure in the master brake cylinder exceeds a first activation threshold that is calculated depending on the vehicle deceleration, and which can be disabled when the brake pressure at a specific instant reaches a bottom threshold value.

The device is characterized in that a counter in the control unit is adapted to be activated at this specific instant and to be deactivated at a predetermined count of the counter, and in that with the counter operating, a comparison can be performed in the control unit between the brake pressure in the master brake cylinder and a second activation threshold that is reduced compared to the first activation threshold and/or a comparison between a brake pressure gradient determined from the signals of the pressure sensor and a predetermined threshold value, and the energy supply unit can be activated with the counter operating, when one of the comparisons has as a result that the brake pressure exceeds the second activation threshold and/or the brake pressure gradient exceeds the predetermined threshold value.

Further advantages, special features, and suitable improvements of the invention can be seen in the subsequent illustration of preferred embodiments of the invention by way of the Figures.

DETAILED DESCRIPTION OF THE DRAWINGS

Figure 1:
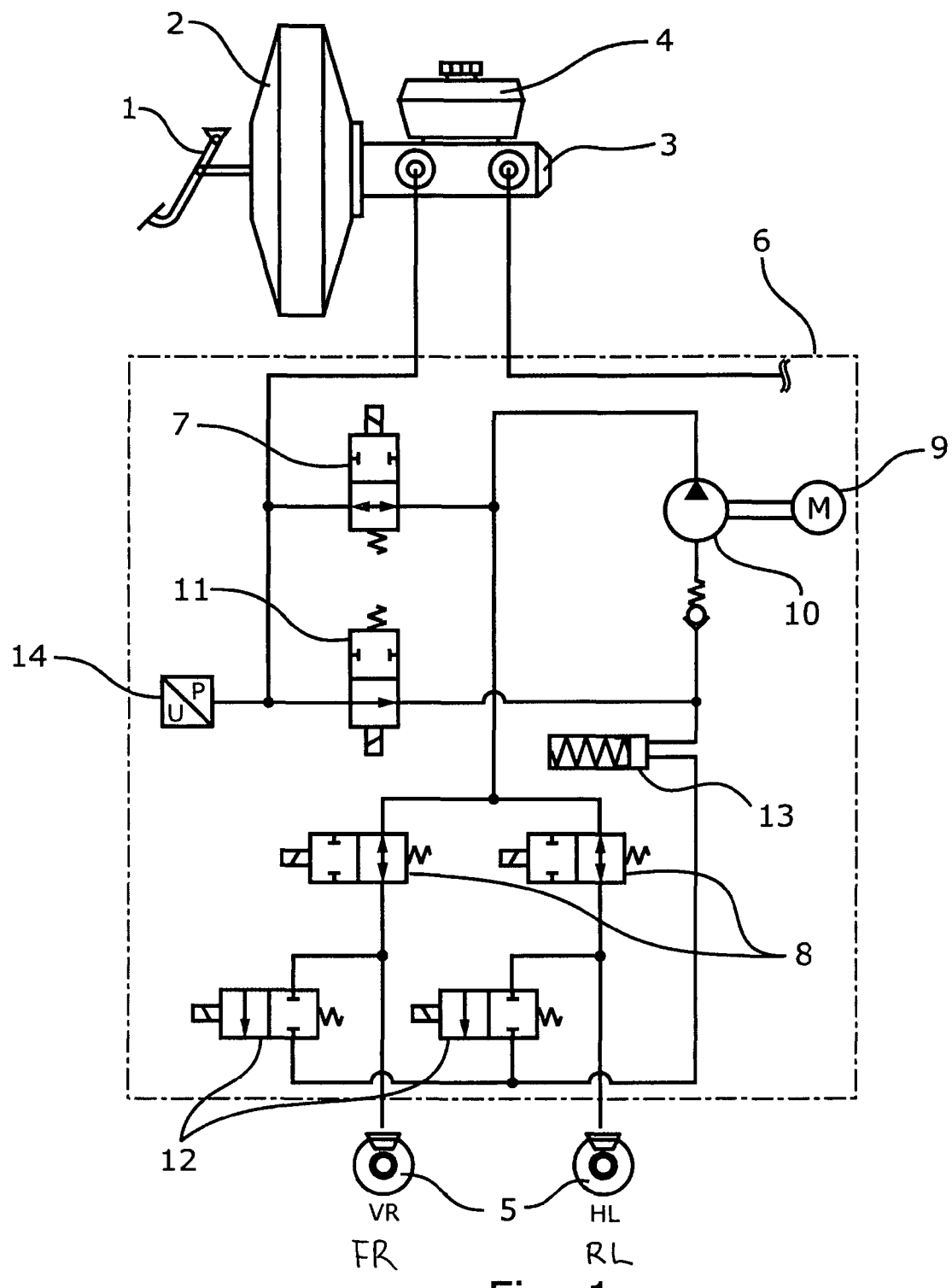
FIG. 1 shows the principal design of a vehicle brake system that is suitable for implementing the invention.

The vehicle brake system that is shown in a cross-sectional view in FIG. 1 and is well suited to implement the invention, comprises an actuating device 1, which is connected to a master brake cylinder 3 by way of a brake booster 2 and is preferably designed as a brake pedal.

The master brake cylinder 3 connects to a supply tank 4 for hydraulic fluid in terms of flow. Advantageously, it is configured as a so-called tandem master cylinder, wherein in each case one of two coupled pressure chambers is provided to supply one brake circuit with pressure. Usually, there is an X-allotment of the brake circuits, meaning that one pressure chamber feeds the front right (FR) and the rear left (RL) wheel brake 5, while the other pressure chamber feeds the front left and the rear right wheel brake 5.

The master brake cylinder 3 connects to the wheel brakes 5 by way of a hydraulic unit 6, which is provided in equal form for each one of the two brake circuits. Therefore, only that part of the hydraulic unit is shown in FIG. 1 that is associated with one of the brake circuits.

The wheel brakes 5 connect to the master brake cylinder 3 by way of a normally open separating valve 7, and one inlet valve 8, which is also normally open, is assigned to each wheel brake 5 in addition. In a brake operation, which is exclusively controlled by the driver, the brake pressure $p_{TMC}$, which is built up in the master brake cylinder 3 by the driver using the brake booster 2 and which is also referred to as initial pressure, is transmitted directly to the wheel brakes 5.

The illustrated brake force system, however, also permits an externally controlled development of brake pressure in the wheel brakes 5 by means of the hydraulic pump 10 driven by the motor 9. For pressure build-up, the separating valve 7 closes and the normally closed change-over valve 11 opens so that a connection is provided between the master brake cylinder 3 and the suction side of the hydraulic pump 10, and the master brake cylinder 3 is uncoupled from the pressure side of the hydraulic pump 10. The hydraulic pump 10 is thus in a position to supply hydraulic fluid from the master brake cylinder 3 or the supply tank 4 into the wheel brakes 5 in order to increase the wheel brake pressure.

A normally closed outlet valve 12 is associated with each wheel brake 5 in order to reduce the brake pressure in the wheel brakes 5. When the outlet valve 12 opens, hydraulic fluid can escape with great dynamics from the corresponding wheel brake 7 into the low-pressure accumulator 13. The hydraulic fluid can then be supplied out of the low-pressure accumulator 13 back into the master brake cylinder 3 using the hydraulic pump 10, to what end the change-over valve 11 and the inlet valves 8 close and the separating valve 7 opens.

In addition, a brake pressure in the wheel brakes 5 can be maintained constant by closing both the inlet valve 8 associated with the wheel brake and the associated outlet valve 12.

The brake pressure $p_{TMC}$ adjusted by the driver in the master brake cylinder 3 is measured by means of a pressure sensor 14, whose signal is transmitted to a control unit that executes the control of the hydraulic unit 6 and the valves 7, 8, 11 and 12 incorporated therein, and of the motor 9.

Brake systems configured in the illustrated way are a component of ESP systems, which are used already in a large number of vehicles and are principally likewise known to the expert in the art. In addition, it is also possible to realize the FBS function, on which the invention at topic founds, with brake systems of this type.

It is provided in the FBS function, that a brake pressure that is increased compared to the driver's specifications is applied to the wheel brakes 5 using the hydraulic pump 10 when a reduced effectiveness of the brake system is detected during a brake operation.

This corresponds to the activation of a so-called brake assist system (BA), the function of which consists in increasing the brake pressure in the wheel brakes 5 compared to the brake pressure $p_{TMC}$. The brake assist system is activated especially in emergency braking situations.

To activate the FBS function, an activation threshold $p_{AT}$ for the brake pressure $p_{TMC}$ in the master brake cylinder 3 is calculated during a brake operation depending on the vehicle deceleration that is measured by means of a longitudinal acceleration sensor and/or determined from the signals of wheel rotational speed sensors, as has been described in detail in German published application DE 102 38 427 A1. Reference is made to the latter publication in connection with the FBS function.

Once the brake pressure $p_{TMC}$ adjusted by the driver in the master brake cylinder 3 exceeds the activation threshold $p_{AT}$, the brake assist system is activated. Preferably, the brake assist system is designed as a so-called hydraulic brake assist system (HBA), where the pressure increase is carried out by means of the hydraulic unit 6, i.e. in particular by means of the hydraulic pump 10 driven by the motor 9, to what end the motor 9 and the valves 7, 11 are driven by the control unit in the corresponding fashion (i.e. the separating valve 7 closes and the change-over valve 11 opens).

The brake assist system is deactivated when the brake pressure $p_{TMC}$ in the master brake cylinder 3 falls under a predetermined threshold value, with the FBS function activated. This condition is based on the fact that the braking request of the driver is detected by the control unit 8 using the brake pressure $p_{TMC}$ measured by the pressure sensor 14. It is assumed that the driver releases the brake when the brake pressure $p_{TMC}$ is decreasing.

When the hydraulic pump 10 is switched on, the brake pressure $p_{TMC}$ in the master brake cylinder 3 will, however, drop as well, without the driver releasing the brake, because hydraulic fluid is sucked by the hydraulic pump 10 out of the master brake cylinder 3.

Figure 2:
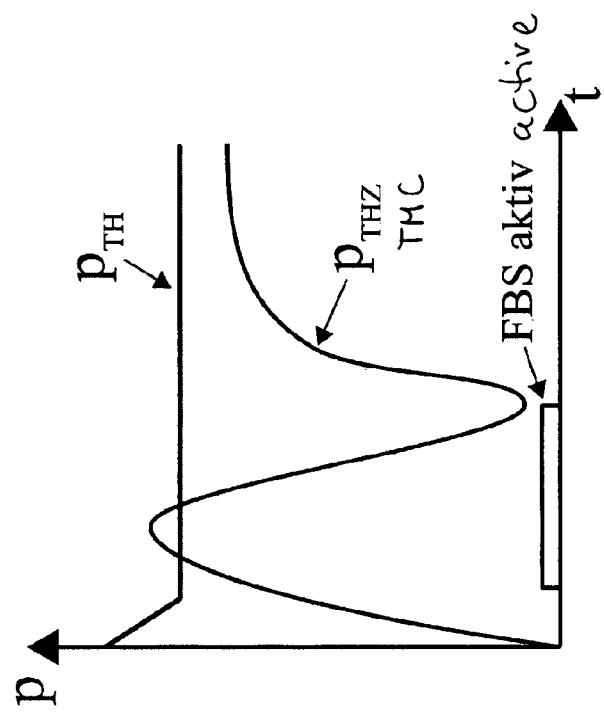
FIG. 2 is a diagram illustrating the time variation of the brake pressure in a wheel brake and the master brake cylinder, the activation threshold of the FBS function, and the activity of the FBS function according to the state of the art.

The diagram in FIG. 2 illustrates the time variations of the brake pressure $p_{TMC}$ in the master brake cylinder 3 and the activation threshold $p_{AT}$, which result in the known FBS function. It is also illustrated in which periods of time the FBS function is active or the hydraulic pump 10 is switched on (FBS active).

It can be seen in FIG. 2 that the activation takes place as soon as the brake pressure $p_{TMC}$ exceeds the activation threshold $p_{AT}$. Subsequent thereto, brake pressure is built up in the wheel brakes 5, which is increased compared to the brake pressure $p_{TMC}$ adjusted by the driver. This is done in that hydraulic fluid is supplied from the master brake cylinder 3 into the wheel brakes 5 using the hydraulic pump 10, with the separating valve 7 being closed and the change-over valve 11 opened.

As a result, the brake pressure $p_{TMC}$ in the master brake cylinder 3 decreases. When the brake pressure reaches a predetermined bottom threshold value, which is not illustrated in FIG. 2, the hydraulic pump 10 is switched off, the change-over valve 11 closes and the separating valve 7 opens. This allows hydraulic fluid to return from the wheel brakes 5 into the master brake cylinder 3, whereby the brake pressure $p_{TMC}$ in the master brake cylinder 3 is re-increased.

When the driver continues with the application of the brake pedal, the brake pressure $p_{TMC}$ again can reach the activation threshold $p_{AT}$, so that the FBS function is re-activated. The result is a cyclical sequence, which repeats until the driver releases the brake pedal so that the FBS function is alternatingly activated and deactivated during a brake operation, with the frequency being defined by the periodic time variation of the brake pressure $p_{TMC}$ in the master brake cylinder 3.

At very high temperatures at the wheel brakes 5, which can be generated e.g. due to continuously braking or braking with only short interruptions when driving downhill, the brake pressure $p_{TMC}$ will, admittedly, rise again after stopping the FBS intervention, but will often not reach the activation threshold $p_{AT}$ again. The diagram in FIG. 2 depicts such a situation.

The reason is that the brake pressure in the brake system drops at very high temperatures because occlusions of compressible gas develop in the otherwise incompressible hydraulic fluid, these occlusions being especially hydrogen blistering occurring when the water contained in the hydraulic fluid evaporates. Further, there is an increased volume requirement in the brake system because the brake pads become 'soft' at high temperatures, and a very low coefficient of friction thus prevails between the pads and the brake disc.

It is arranged within the limits of the invention that the FBS function is activated again already at a lower re-increase of the brake pressure $p_{TMC}$ in the master brake cylinder 3.

The activation of the FBS function in particular implies switching on the hydraulic pump 10 or the motor 9, respectively, closing the separating valve 7 and opening the change-over valve 11, which will, however, not be described explicitly in the following. Accordingly, when an FBS intervention is stopped, i.e. when the FBS function is deactivated, in particular the hydraulic pump 10 or the motor 9, respectively, is switched off, the separating valve 7 opens and the change-over valve 11 closes, what will likewise not be described explicitly in the following.

To implement the invention, it is provided that a reduced activation threshold $p_{AT,red}$ is made the basis for the new activation of the FBS function during a predetermined interval, which commences when the brake pressure $p_{TMC}$ has reached the bottom threshold value in a first FBS intervention or the hydraulic pump 10 is switched off, respectively.

When the brake pressure $p_{TMC}$ in the master brake cylinder 3 reaches the bottom threshold value, a counter in the control unit is set to operate, starting from the initial value 0, which is used to measure the predetermined interval.

During this interval, that means before the expiry of the interval has been detected by the counter, the brake pressure $p_{TMC}$ in the master brake cylinder 3 is compared by the control unit with the reduced activation threshold $p_{AT,red}$ (instead of the original activation threshold $p_{AT}$), and the FBS function is activated when the value of the brake pressure $p_{TMC}$ exceeds the value of the reduced activation threshold $p_{AT,red}$.

When the brake pressure $p_{TMC}$ thereafter drops below the bottom threshold value again, with the FBS function activated, so that the FBS intervention is terminated again, the counter is reset to the value 0 and is started based on this value.

In the event of a new re-increase of the brake pressure $p_{TMC}$ in the master brake cylinder 3 during the predetermined period measured by the counter, again the reduced activation threshold $p_{AT,red}$ is made the basis for the activation of the FBS function.

Figure 3:
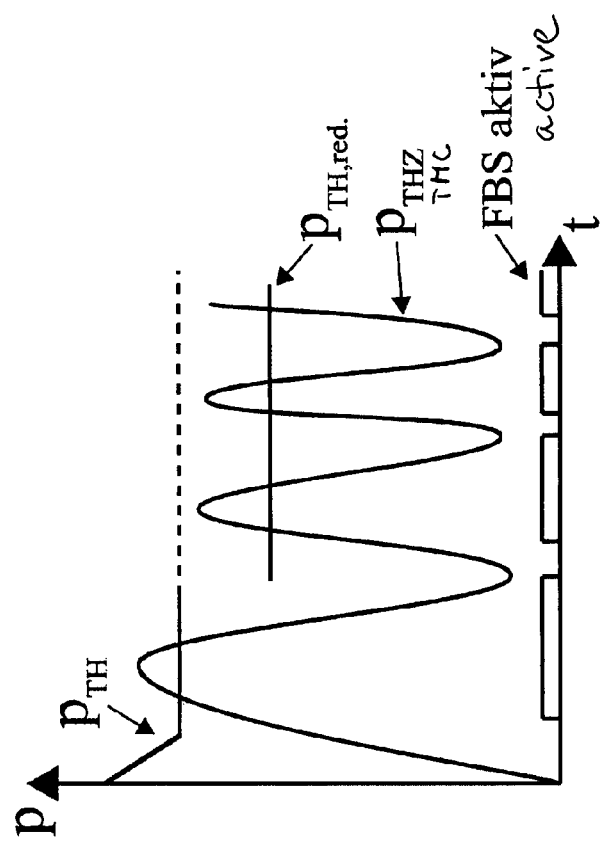
FIG. 3 is a diagram illustrating the time variation of the brake pressure in a wheel brake and the master brake cylinder, the activation threshold of the FBS function, and the activity of the FBS function according to the invention.

This procedure is illustrated in the diagram in FIG. 3 showing the time variation of the brake pressure $p_{TMC}$ in the master brake cylinder 3, the activation threshold value $p_{AT}$, the reduced activation threshold $p_{AT,red}$ as well as the periods in which the FBS function is activated (FBS active).

In this respect, it becomes especially apparent from FIG. 3 that the value of the activation threshold $p_{AT}$, as calculated by way of the vehicle deceleration is decisive for the first activation of the FBS function in a brake operation, while in the subsequent pressure increases the value of the reduced activation threshold $p_{AT,red}$ is made the basis for the activation of the FBS function, said pressure increases being due to the return flow of hydraulic fluid into the master brake cylinder 3, which takes place when the FBS function is deactivated.

A new activation of the FBS function is executed this way especially when the brake pressure $p_{TMC}$ does not reach the original activation threshold $p_{AT}$ during the brake operation, as FIG. 3 shows.

Apart from the previously illustrated possibility of identifying a re-increase of the brake pressure $p_{TMC}$ by way of the reduced activation threshold $p_{AT,red}$ the invention includes in addition or alternatively another possibility of detecting the re-increase of the brake pressure in the master brake cylinder 3.

It is arranged that a comparison between the rate of change of the brake pressure $p_{TMC}$ in the master brake cylinder 3 referred to as brake pressure gradient and a predetermined threshold value is carried out during the predetermined interval after the bottom pressure threshold value has not been reached, in order to detect a re-increase of the brake pressure $p_{TMC}$. The brake pressure gradient can be determined from the signals of the pressure sensor 14.

A new activation of the FBS function after a previous drop in pressure in the master brake cylinder 3 and a resulting stop of the FBS intervention takes place when the brake pressure gradient exceeds the predetermined threshold value.

As this occurs, it is likewise provided that the counter measuring the predetermined interval is always reset to the value 0 when the brake pressure $p_{TMC}$ reaches the bottom threshold value, with the FBS function activated, so that an evaluation of the brake pressure gradient and a quick restart of the hydraulic pump 10 take place with each re-increase of the brake pressure $p_{TMC}$ during a brake operation.

Using the evaluation of the brake pressure gradient allows detecting a re-increase of the brake pressure $p_{TMC}$ in the master brake cylinder 3 particularly quickly and, thus, permits a new activation of the FBS function also in a particularly quickly manner.

In both illustrated possibilities of the invention for detecting a re-increase of the brake pressure $p_{TMC}$ in the master brake cylinder 3 it is arranged that upon expiry of the predetermined interval, i.e. when a predetermined counter value is reached, the original activation threshold $p_{AT}$ that is determined depending on the vehicle deceleration is again made the basis for the activation of the FBS function.

When a pressure increase in the master brake cylinder 3, that is detected based on the previously described criteria, fails to appear during the predetermined interval, it must be assumed that the driver has released the brake and terminated the brake operation.

A new pressure increase will not take place until a new brake application does, which the driver executes for introducing another brake operation. The activation threshold $p_{AT}$ that is calculated based on the vehicle deceleration is then decisive for the first activation of the FBS function so that FBS interventions are only made when a reduced effectiveness of the brake system of the vehicle is detected.

LIST OF REFERENCE NUMERALS

1 actuating device
2 brake booster
3 master brake cylinder
4 supply tank
5 wheel brake
6 hydraulic unit
7 separating valve
8 inlet valve
9 motor
10 hydraulic pump
11 change-over valve
12 outlet valve
13 low-pressure accumulator
14 pressure sensor
p pressure
$p_{AT}$ activation threshold
$p_{TH,red}$ reduced activation threshold
$p_{TMC}$ brake pressure in the master brake cylinder
t time

The invention claimed is:

1. A method for increasing a braking effect in a motor vehicle having a hydraulic brake system, wherein an on an energy supply unit, which is used to increase the brake pressure in at least one wheel brake, when a brake pressure adjusted by a driver in a master brake cylinder exceeds a first activation threshold, which is determined depending on a detected vehicle deceleration, and the energy supply unit is switched off when the brake pressure reaches a predetermined bottom threshold value at a specific instant, the method comprising:
   checking within an interval beginning at that specific instant whether the brake pressure ($p_{TMC}$) rises using at least one of a comparison between the brake pressure and a second activation threshold ($p_{AT,red}$) that is reduced compared to the first activation threshold ($p_{AT}$) and using a comparison between a brake pressure gradient and a predetermined threshold value; and switching the energy supply unit (9, 10) to on again when a new rise of the brake pressure ($p_{TMC}$) has been detected.

2. A method according to claim 1, wherein the energy supply unit (9, 10) is switched on again when the brake pressure ($p_{TMC}$) exceeds the second activation threshold ($p_{AT,red}$).

3. A method according to claim 1, wherein the energy supply unit (9, 10) is switched on again when the brake pressure gradient exceeds the predetermined threshold value.

4. A method according to claim 1, wherein the energy supply unit (9, 10) is switched on according to the first activation threshold ($p_{AT}$), when no new increase of the brake pressure is detected within the interval after a drop of the brake pressure ($p_{TMC}$) below the predetermined bottom threshold value.

5. A method according to claim 1, wherein the energy supply unit (9, 10) is a pump (10) driven by a motor (9).

6. A method according to claim 1, wherein the energy supply unit (9, 10) is a component of an electronic stability control system.

7. A device for increasing a braking effect of a hydraulic brake system of a motor vehicle, having a master brake cylinder, in which a brake pressure transmittable to at least one wheel brake can be built up, a pressure sensor adapted to sense the brake pressure in the master brake cylinder, a control unit connected to the pressure sensor, and an energy supply unit that is controllable by the control unit and can be enabled when it is detected in the control unit that the brake pressure in the master brake cylinder exceeds a first activation threshold that is calculated depending on the vehicle deceleration, and which can be disabled when the brake pressure reaches a bottom threshold value at a specific instant, the device comprising:

a counter in the control unit adapted to be activated at the specific instant and to be deactivated at a predetermined count of the counter, and in that with the counter operating, at least one comparison can be performed in the control unit between the brake pressure ($p_{TMC}$) in the master brake cylinder (3) and a second activation threshold ($p_{AT,red}$) that is reduced compared to the first activation threshold ($p_{AT}$) and between a brake pressure gradient determined from the signals of the pressure sensor (14) and a predetermined threshold value, and the energy supply unit (9, 10) can be activated with the counter operating, when the at least one comparison has at least one result that the brake pressure ($p_{TMC}$) exceeds the second activation threshold and the brake pressure gradient exceeds the predetermined threshold value.

\* \* \* \* \*